(12) United States Patent
McBride

(10) Patent No.: US 6,786,364 B2
(45) Date of Patent: Sep. 7, 2004

(54) TRANSPORTABLE STORAGE WITH AN AUTONOMOUS DISPENSING SYSTEM

(76) Inventor: Dale McBride, P.O. Box 1374, Morgantown, WV (US) 26507

( * ) Notice: Subject to any disclaimer, the term of this patent is extended or adjusted under 35 U.S.C. 154(b) by 0 days.

(21) Appl. No.: 09/682,225

(22) Filed: Aug. 8, 2001

(65) Prior Publication Data

US 2003/0029888 A1 Feb. 13, 2003

(51) Int. Cl.[7] ............................ B65D 35/56; B67D 5/42; G01F 11/00
(52) U.S. Cl. ...................... 222/389; 222/386.5; 222/96; 222/105
(58) Field of Search ........................ 222/95, 96, 386.5, 222/389, 105

(56) References Cited

U.S. PATENT DOCUMENTS

| | | |
|---|---|---|
| 1,743,056 A | 1/1930 | Whitaker |
| 2,209,570 A | 7/1940 | Kraft |
| 2,451,911 A | 10/1948 | Braden |
| 2,612,924 A | 10/1952 | Cunningham |
| 2,615,487 A | 10/1952 | Cunningham |
| 2,724,418 A | 11/1955 | Krupp |
| 2,744,043 A | 5/1956 | Ramberg |
| 2,848,133 A | 8/1958 | Ramberg |
| 2,851,075 A | 9/1958 | Palfey |
| 2,854,048 A | 9/1958 | Cunningham |
| 2,865,419 A | 12/1958 | Cunningham |
| 2,969,102 A | 1/1961 | Cunningham |
| 2,991,815 A | 7/1961 | Pfeiffer |
| 3,009,566 A | 11/1961 | Oakley |
| 3,123,254 A | 3/1964 | Babby et al. |
| 3,178,050 A | 4/1965 | Doerpingahus |
| 3,282,361 A | 11/1966 | Mackie |
| 3,334,676 A | 8/1967 | Girard |
| 3,339,803 A | 9/1967 | Wayne et al. |
| 3,400,741 A | 9/1968 | Robinson et al. |
| 3,404,813 A | 10/1968 | Waxman |
| 3,468,731 A | 9/1969 | Oheda |
| 3,478,952 A | 11/1969 | Perlman |
| 3,504,827 A | 4/1970 | Larson |
| 3,559,708 A | 2/1971 | Cook |
| 3,592,360 A | 7/1971 | Aleck |
| 3,722,751 A | 3/1973 | Bisciglia |
| 3,921,674 A | 11/1975 | Logan et al. |
| 3,982,573 A | 9/1976 | Jones |
| 4,010,783 A | 3/1977 | Ralston |
| 4,213,545 A | 7/1980 | Thompson et al. |
| 4,216,881 A | 8/1980 | Rosman |
| 4,468,812 A | 8/1984 | Grosvenor |
| 4,522,235 A | 6/1985 | Kluss et al. |
| 4,567,918 A | 2/1986 | Curiel |
| 4,597,425 A | 7/1986 | Tally |
| 4,690,306 A | 9/1987 | Staheli |
| 4,714,178 A | 12/1987 | Bohl et al. |
| 4,732,299 A | 3/1988 | Hoyt |
| 4,817,830 A * | 4/1989 | Yavorsky .................. 222/386.5 |
| 4,826,045 A | 5/1989 | Price et al. |
| 5,115,947 A | 5/1992 | McDonnell |
| 5,230,566 A | 7/1993 | Jackson et al. |
| 5,344,045 A * | 9/1994 | Richter et al. ............ 222/386.5 |
| 5,398,851 A * | 3/1995 | Sancoff et al. ............ 222/386.5 |
| 5,435,468 A * | 7/1995 | Clark, II ...................... 222/389 |
| 5,499,743 A | 3/1996 | Blumenkron |
| 5,647,510 A | 7/1997 | Keller |
| 6,129,236 A * | 10/2000 | Osokin et al. ............ 222/386.5 |

* cited by examiner

Primary Examiner—Kevin Shaver
Assistant Examiner—Stephanie L. Willat
(74) Attorney, Agent, or Firm—Jackson Kelly PLLC; Monika J. Hussell

(57) ABSTRACT

The system of the present invention has a flexible bladder designed to provide for the transfer of liquids from a storage/transport unit to vehicles without the necessity of pumps and/or motors. The system includes a flexible, collapsible bladder that uses compressed gas or air, or a pressurized liquid, to pressurize the unit. The bladder is constructed with a flexible internal diaphragm which extends from a portion of the interior of the bladder, and separates the ends of the bladder. The system further comprises removable means to inject air, gas or fluid into the first end of the bladder and removable means to inject and expel the fluid stored in the second end of the bladder.

11 Claims, 4 Drawing Sheets

TRANSPORTABLE STORAGE WITH AN AUTONOMOUS DISPENSING SYSTEM

BACKGROUND OF INVENTION

The present invention relates to fluid storage and expulsion systems where the fluid is expelled out of a storage unit by a positive expulsion mechanism. In addition, the present invention relates to diaphragm-type fluid expulsion systems.

The system of the present invention has a bladder designed to provide for the transfer of liquids from the bladder to vehicles, as well as uses in other environments, without the necessity of pumps and/or motors in the expulsion of the liquids from the system of the present invention. The system includes a flexible, collapsible bladder constructed with an internal diaphragm separating first and second ends of the bladder, whereby compressed gas or air, or pressurized liquid is injected into the first end of the bladder, causing the diaphragm to move from the first end towards the second end of the bladder, thereby creating sufficient pressure in the bladder to cause controlled release of the liquid or semi-liquid stored therein.

Flexible fluid storage units are generally known in the art; however, they are typically unequipped to easily expel the fluid from the unit by applying controlled pressure in a contained environment within the unit. Further, while flexible storage units tend to be more mobile than rigid reservoirs, the cumbersome means for applying pressure (including the use of pumps or motors) make them, in many instances less portable. Some flexible storage units in the art are designed to permit gravity to expel the liquid stored therein, which fails to permit rapid and controlled expulsion of the liquid. Other flexible storage units comprise a single reservoir which stores liquid and into which pressurized air is injected to facilitate the expulsion of the stored liquids; however, the failure to isolate the stored liquid causes, in many applications, contamination or instability thereof. Certain durable flexible storage units used in warfare currently require that a vehicle's tire drive over a portion thereof to cause the expulsion of the stored substance; this design, however, is limited in its use as it requires the use of only certain tires and vehicles, does not permit a controlled expulsion from the reservoir, and is subject to failure and deterioration from abrasion or puncture. Additionally, flexible fluid storage units are typically manufactured from relatively non-durable materials, and therefore are susceptible to damage when used in extreme conditions (e.g., warfare) and are less likely to be reused.

Diaphragm-type fluid expulsion systems are also generally known in the art; however, they typically are manufactured from rigid components and therefore are less mobile than flexible fluid storage units and are more susceptible to damage during transport or failure over repeated use. Further, due to the rigidity of the components, these types of fluid expulsion systems typically are not collapsible and easily transported when not in use.

Therefore, there is a need for a flexible, collapsible, durable, easily transportable and self-contained fluid storage and expulsion system. Further, there is a need for a flexible fluid storage system which isolates the stored fluid from air or gas injected to facilitate the expulsion of the fluid.

SUMMARY OF INVENTION

An object of the present invention is to provide a flexible, collapsible, durable, easily transportable, reusable and self-contained fluid storage and expulsion system.

It is a further object of this invention to provide a flexible fluid storage system which isolates the stored fluid from air, gas or liquid injected to facilitate the expulsion of the fluid.

It is a further object of this invention to provide a flexible fluid storage system which is designed to permit the efficient and controlled expulsion of liquids or semi-liquids stored therein.

It is a further object of this invention to provide a flexible fluid storage system which is sufficiently durable to withstand severe environments, including warfare, in initial use and re-use.

The present invention satisfies all of these objects. The present invention is a completely self-contained, transportable storage system with an autonomous dispensing feature. The storage system is also flexible, durable, re-usable, and collapsible when empty. Further, the storage system of the present invention is fully enclosed and stores fluid in a closed system, free from contact with the air, gas or liquid used to create pressure within the bladder or otherwise in the environment, thereby reducing contamination and minimizing the condensation of water. Transport of this storage system can readily be accomplished by boat, vehicle or plane.

The storage system of the present invention comprises a flexible, collapsible bladder, a flexible diaphragm incorporated within said bladder and extending continuously from a portion of an interior layer of said bladder, pressure means for injecting and releasing compressed air or gas, or pressurized fluid, to and from a first end of the bladder, and injection and expulsion means for injecting and expelling liquids or semi-liquids stored in a second end of the bladder, with the diaphragm defining the first and second ends of the bladder and separating the gases or fluids stored or used from time to time in each such end. Upon injecting compressed gas or air, or a pressurized liquid, into the first end of the bladder, the diaphragm expands from the first end of the bladder, thereby exerting pressure on the liquid in the second end of the bladder, permitting the controlled and expedient expulsion thereof from the bladder.

The bladder has a flexible exterior and interior, where the material used in the bladder exterior is durable and can withstand the pressures and environment associated with the intended use of the system, and the material used in the bladder interior is compatible with, impervious to and not subject to corrosion by the liquid stored in the second end of the bladder or the air, gas or liquid injected into the first end of the bladder. Both the interior and exterior layers of the bladder must be sufficiently flexible to permit the collapsibility of the present invention, and to withstand the designed internal pressure of the system. The diaphragm of the storage system of the present invention extends from the interior-most layer of the bladder, and therefore comprises the same flexible material as the bladder interior. When the system is full, the diaphragm rests along the first end of the bladder; when liquid is being expelled from the bladder by means of injecting pressurized air, gas or fluid into the first end of the bladder, the diaphragm moves from the first end towards the second end of the bladder until it rests flat against the second end of the bladder after full expulsion of all liquid stored therein.

The pressure means of the present invention comprises generally a pressure port integrated with the first end of the bladder, allowing compressed air, gas or liquids to be injected thereto and expelled therefrom, and removable means for storing and transferring such compressed air, gas or liquid (e.g., portable air compressor) to the pressure port.

The injection and expulsion means of the present invention comprises generally a fluid port integrated with the second end of the bladder, allowing liquids or semi-liquids to be injected for storage into the second end of the bladder, and expelled therefrom, and removable means for transferring such liquids or semi-liquids to the fuel port (e.g., fuel pump) and means for expelling the liquids or semi-liquids from the bladder (e.g., fuel hose).

The size of the bladder may vary greatly depending upon the quantity and quality of liquid to be stored therein and the intended means of transportation.

DETAILED DESCRIPTION

Figure 1:
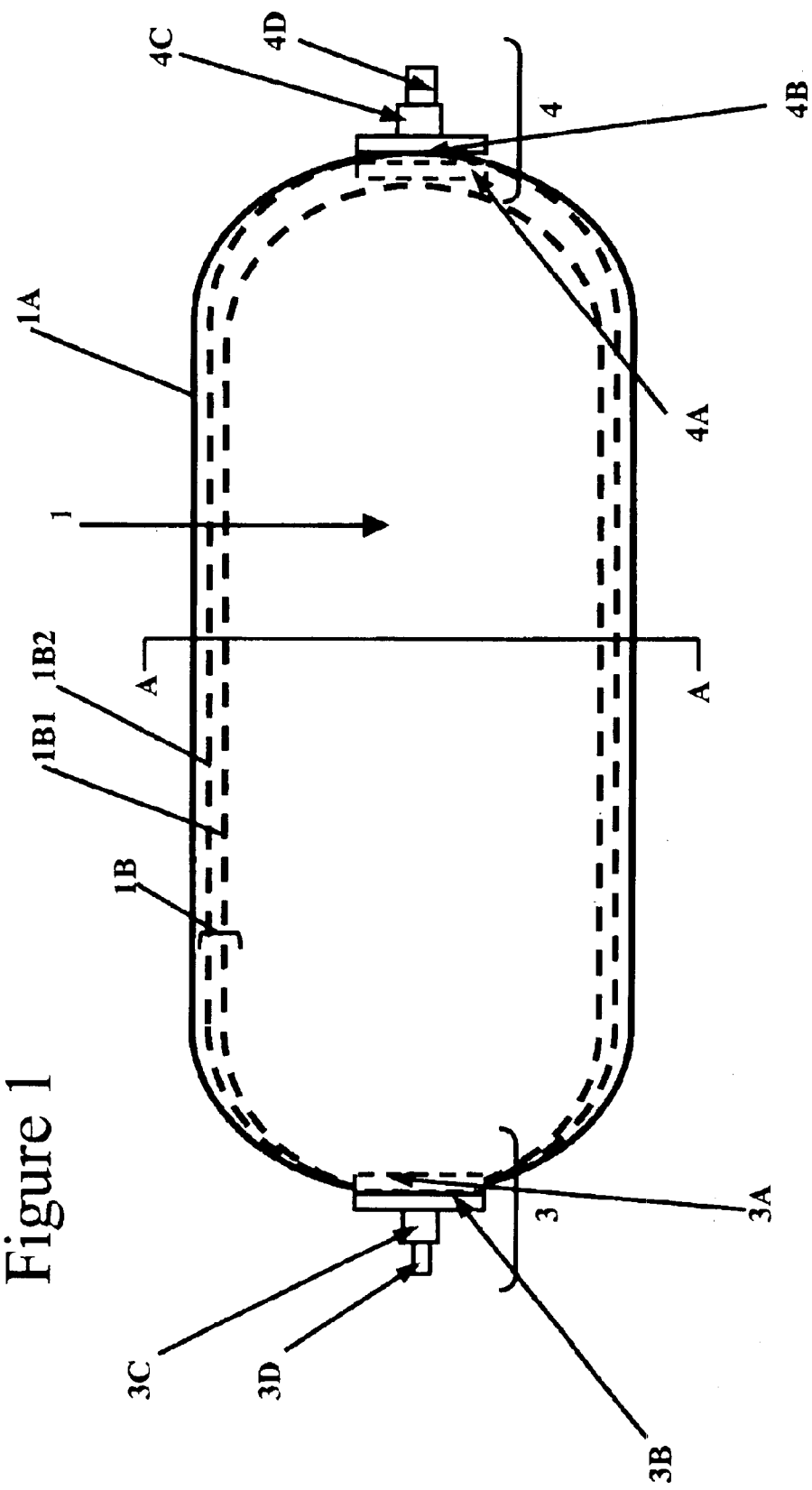
FIG. 1 shows a top view of a preferred embodiment of the system of the present invention when the same is empty of stored liquid, with internal components thereof shown by dashed lines.

The transportable storage system of the present invention comprises a flexible, collapsible bladder (1), preferably cylindrical in shape, having an orifice at each end thereof, with a flexible diaphragm incorporated within said bladder and extending continuously from a portion of the interior layer of said bladder, as further described hereinafter. The system of the present invention further comprises pressure means (3) for injecting and releasing compressed air, gas or fluid to and from a first end of the bladder (1), and injection and expulsion means (4) for injecting and expelling liquids or semi-liquids stored in a second end of the bladder (1), with the diaphragm defining the first and second ends of the bladder (1), and separating the gases or fluids stored or used in each such end.

The bladder (1) is manufactured from one or more types of rubber or other flexible material, where the material used has sufficient strength and elasticity so that the system withstands the stress of transport and other anticipated physical and environmental factors, and further is compatible with, impervious to and not subject to corrosion by the gases or fluids intended to be stored or used in the first and second ends of the bladder (1). Suitable materials from which the bladder (1) can be manufactured must further have sufficient strength and elasticity to withstand and retain the designed internal pressure of the system, and sufficient pliability to maintain the flexible and collapsible qualities of the present invention.

The bladder (1) has at least two layers of rubber or other flexible material as described above, an exterior layer (1A) manufactured from a material sufficiently strong to protect the system in transportation and use, and an interior layer (1B) manufactured from a material impervious to and not subject to corrosion by the gasses or fluids intended to be stored or used in the respective ends of the bladder (1). The interior layer (1B) has a first interior layer (1B1) and a second interior layer (1B2). The second interior layer (1B2) is bonded to the exterior layer (1A). The first interior layer (1B1) is partially bonded to said second interior layer, with the unbonded portions of said first interior layer forming. Thus, the second interior layer (1B2) and the exterior of the diaphragm define the second end of the interior of the bladder (1), and the first interior layer (1B1) and the interior of the diaphragm define the first end of the interior of the bladder. Except as necessary to distinguish these interior layers, both shall be referred to herein as the interior layer (1B) of the bladder (1).

One intended use of the system of the present invention is to store and transport petroleum based liquids or semi-liquids, with possible means of transportation by air, where the system is transported to location and dropped around twenty feet to the ground. The system may be further transported on the ground prior to and after use. It is anticipated that the system may be subject to temperature ranges from -25.degree. F. to +140.degree. F. It is further intended that compressed air shall be used in the first end of the bladder to cause the diaphragm to inflate and deflate as hereinafter described. With these specifications in mind, the inventor prefers to use neoprene for the bladder exterior (1A), and nitrile rubber for the bladder interior (1B). It is well known in the art that neoprene is a weather resistant, durable material, sufficient to withstand the foregoing conditions, and that nitrile rubber is impervious to, and not subject to corrosion by, petroleum based substances or pressurized air, and that both materials are sufficiently flexible and collapsible for purposes of the system of the present invention.

Suitable neoprenes for use in the preferred system as described above preferably have specifications as follows: unaged hardness, Shore A, between 55 and 65; tensile strength of at least 2466 psi; and ultimate elongation of at least 400%. When subjected to heat resistance for 70 hours at 100° C., suitable neoprenes should produce a maximum increase in unaged hardness, Shore A, of 15; a maximum decrease in tensile strength of 15%; and a maximum decrease in ultimate elongation of 40%. When subjected to fluid resistance, ASTM #903 oil, for 70 hours at 100° C., suitable neoprenes should result in a maximum decrease in tensile strength of 60%; a maximum decrease in ultimate elongation of 50%; and a maximum increase in volume of 100%. Finally, the compression set for 22 hours at 100° C. for suitable neoprenes should be no more than 35%.

Suitable nitrile rubbers for use in the preferred system preferably have specifications as follows: unaged hardness, Shore A, between 65 and 75; tensile strength of at least 1450 psi; and ultimate elongation of at least 250%. When subjected to heat resistance for 70 hours at 100° C., suitable nitrile rubbers should produce a maximum change in unaged hardness, Shore A, of 15; a maximum change in tensile strength of 30%; and a maximum decrease in ultimate elongation of 50%. When subjected to fluid resistance, ASTM #903 oil, for 70 hours at 100° C., suitable nitrile rubbers should result in a maximum increase in volume of 40%. Finally, the compression set for 22 hours at 100° C. for suitable nitrile rubbers should be no more than 50%.

It would be understood by one skilled in the art that other types of elastic materials may be appropriate under the circumstances described above, and that under different circumstances (e.g., storage of different substances or less/more rigorous transportation and environmental stresses), different types of rubber or materials may be more desirable, while retaining the flexible, collapsible and durable qualities of the system of the present invention.

Where different types of material are used to form the bladder interior (1B) and the bladder exterior (1A), and where the materials used do not naturally bond together when cured, it will be necessary to use a bonding rubber or other material between the layers of the bladder (1) to facilitate the bonding thereof. In the inventor's preferred system, nitrile rubber and neoprene do not naturally bond together when cured and therefore the inventor prefers to place a layer of tygum between the bladder interior (1B) and the bladder exterior (1A), to facilitate the bonding thereof. It would be obvious to one skilled in the art to use other suitable bonding materials, if any, depending on the materials used in the manufacture of the bladder (1).

Suitable tygums for use in the preferred system as described above preferably have specifications as follows: unaged hardness, Shore A, between 45 and 55; minimum tensile strength of 2466 psi; and minimum ultimate elongation of 450%. When subjected to heat resistance for 70 hours at 100° C., suitable tygums should produce a maximum increase in hardness of 15; a maximum decrease in tensile strength of 15%; and a maximum decrease in ultimate elongation of 40%. When subjected to fluid resistance, ASTM #903 oil, for 70 hours at 100° C., suitable tygums should result in a maximum decrease in tensile strength of 60%; a maximum decrease in ultimate elongation of 50%; and a maximum increase in volume of 100%. Finally, the compression set for 22 hours at 100° C. for suitable tygums should be no more than 80%.

When necessary to strengthen the bladder (1) based upon the intended use of the system and/or the type(s) of material used in the manufacture of the bladder (1), at least one layer of fiber (1C) may need to be wound between the interior (1B) and exterior (1A) layers of the bladder (1). In the preferred system described above, the inventor prefers to wind Easter Weld III Treated Polyester, a polyester fiber coated with resin, around substantially all of the exterior of the interior layer (1B) of the bladder (1) in a cross-hatch pattern, at a first angle to the longitudinal axis of the bladder (1) to control longitudinal expansion, and at a second angle to the latitudinal axis of the bladder (1) to control diametric expansion. The angles of the wind vary depending on the size and shape of the bladder (1), and are typically determined by the filament winding machine used to wind the fiber on the bladder interior (1B). Additional layers of fiber can be wound around the interior (1B) of the bladder for added strength. The resin of the preferred fiber causes it to adhere to the interior layer (1B) of the bladder (1) and the bonding layer, or if no such layer is present, the exterior layer (1A) of the bladder (1), as described above before the bladder is cured. It would be obvious to one skilled in the art that other strengthening materials could be used in the present invention provided that they do not compromise the flexible and collapsible qualities thereof and do not interfere with the bonding of the interior (1B) and exterior (1A) layers of the bladder (1).

Figure 2:
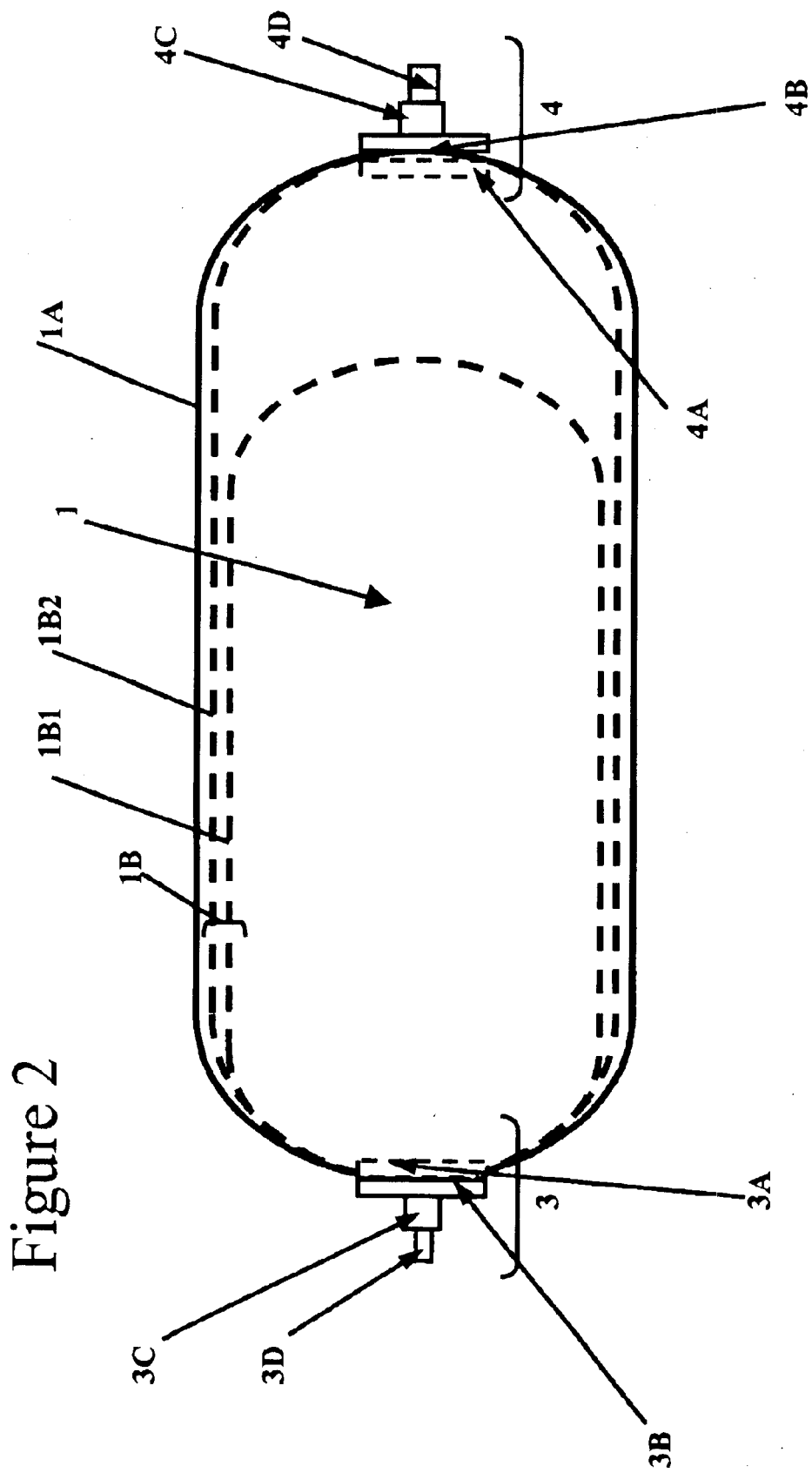
FIG. 2 shows a top view of a preferred embodiment of the system of the present invention when the same is partially full of stored liquid, with internal components thereof shown by dashed lines.
Figure 3:
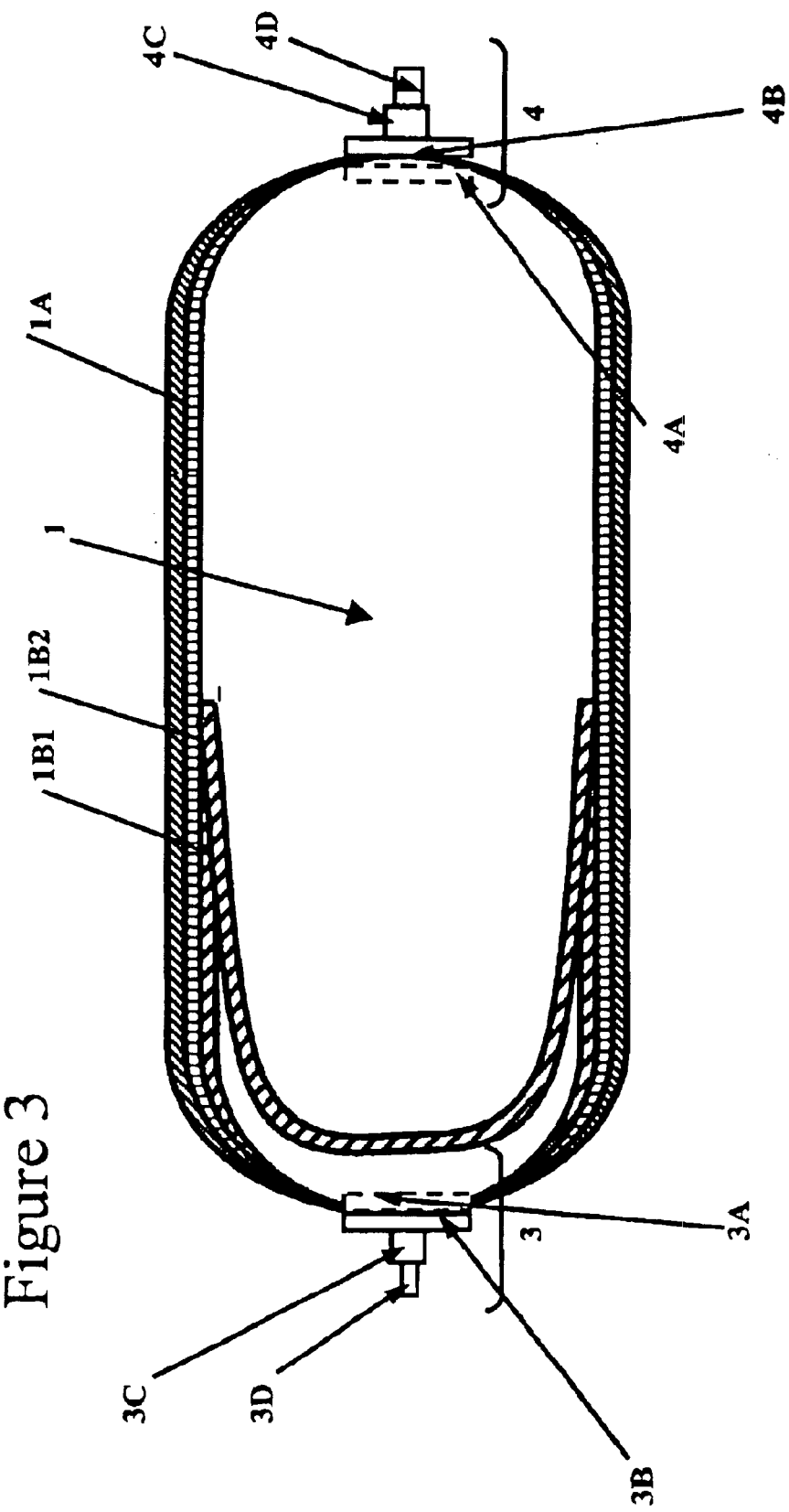
FIG. 3 shows a top view of a preferred embodiment of the system of the present invention when the same is substantially full of stored liquid, with internal components thereof shown by dashed lines.
Figure 4:
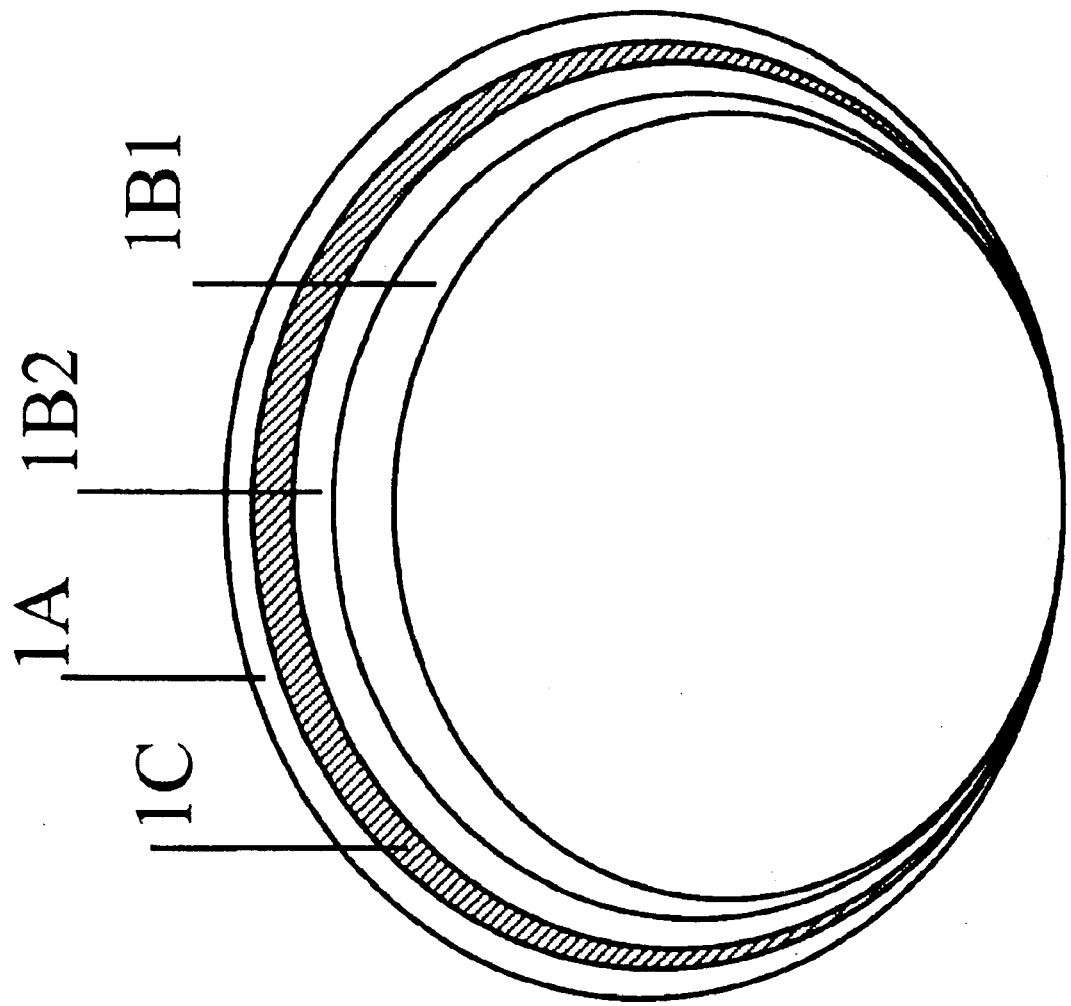
FIG. 4 shows a cross-section view along the line A—A of FIG. 1 of a preferred embodiment of the invention.
Figure 1:
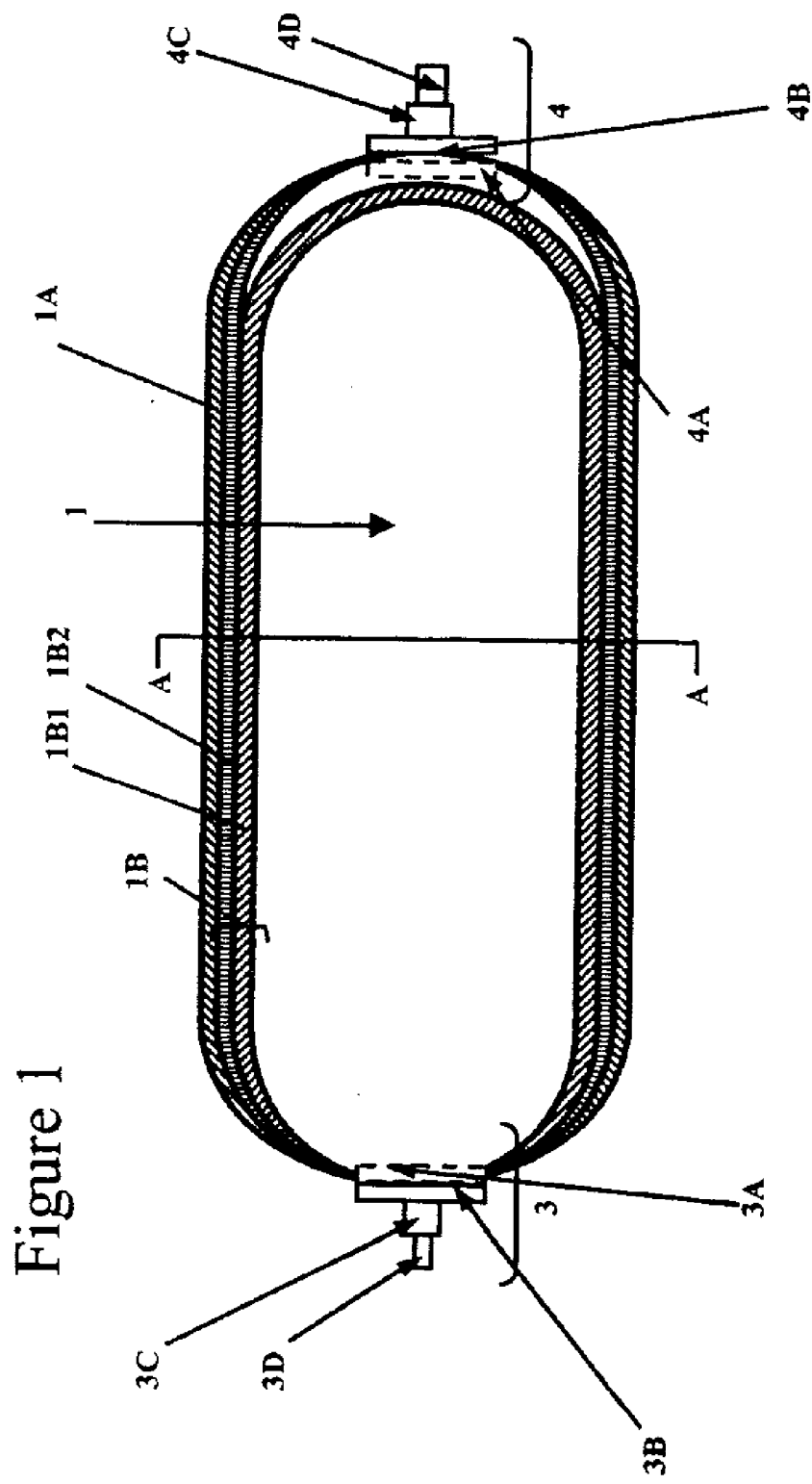
Figure 2:
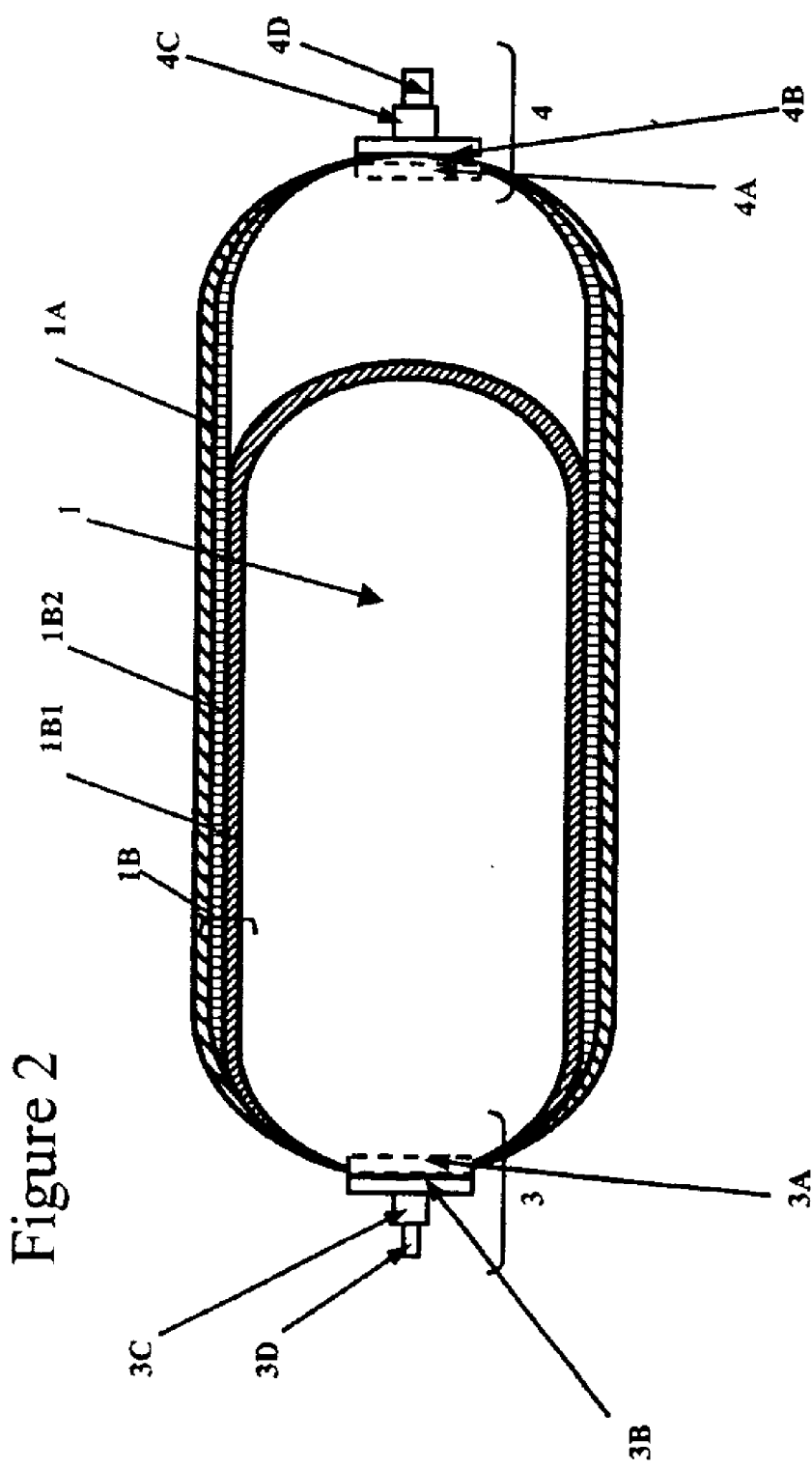

The bladder (1) of the present invention is constructed with a flexible, internal diaphragm (2), defining the first and second ends of the bladder, which diaphragm extends from the first interior layer (1B) of the bladder (1) and is capable of expanding to substantially the same shape and size of the second end of the bladder (1). The diaphragm is preferably manufactured from the same material as the interior layer of the bladder (1). The inventor prefers that the diaphragm extend from the bladder (1) along the longitudinal circumference of the bladder (1), at the latitudinal center of the bladder, as depicted in the figures; however, it would be understood by one skilled in the art that the diaphragm may be positioned differently within the bladder (1). The diaphragm is capable of expanding to a concave position within the bladder (1) when the bladder is empty (see FIG. 1), a convex position when the bladder is full (see FIG. 3) or any other intermediate position when the bladder is partially filled (see FIG. 2).

The system of the present invention further comprises pressure means (3) affixed to the first end of the bladder (1), controlling the flow of compressed air, gas or fluid into and from the first end of the bladder (1). The pressure means preferably comprises a first rigid plate (3A) affixed to the interior of the first end of the bladder (1), and a second rigid plate (3B) affixed to the exterior of the first end of the bladder (1) and the first rigid plate (3A), each of said plates having an orifice, said orifices being aligned with the orifice of the first end of the bladder. In order to facilitate the affixation of said plates (3A) and (3B) to each other and to the bladder, the inventor prefers to incorporate on the face of the first plate (3A) a hollow threaded stub (3C), and to drill a corresponding threaded hole in the second plate (3B), permitting the second plate (3B) to screw onto the stub (3C), thereby securing the plates to one another and to the bladder (1). Additionally, the plates are each preferably secured to the bladder (1) using a standard adhesive compatible with the materials of the bladder and the plates. Standard thread sealant is preferably applied to the threads of the threaded stub (3C) prior to screwing on the second plate (3B) to prohibit the gas or liquid used in the first end of the bladder (1) from leaking in use.

Said pressure means (3) further comprises an intake nozzle (3D) which the inventor prefers to affix to the exposed end of the threaded stub (3C) in the preferred embodiment, such that when the plates (3A) and (3B) are affixed to one another and the bladder (1), a portion of said threaded stub (3C) and intake nozzle (3D) and threaded stub (3C) extends beyond the outer or exposed face of the second plate (3B). A dust cap maybe placed on the intake nozzle (3D) to protect the same during transport. Optionally, an open cylinder may be concentrically affixed to the face of the second plate (3B), extending from the exterior of the bladder (1) and beyond the end of the intake nozzle (3D), to protect the same during transport and use.

The pressure means (3) of the present invention further comprises a removable and portable air compressor or tank, or pressurized gas or liquid injector, which provides at least 3 psi air, liquid or other gas to the first end of the bladder (1) by means of the intake nozzle (3D). The intake nozzle (3D) of the present invention should be compatible with the compressor, tank or injector used in the present invention.

Depending on the components of the fluid injection and expulsion means (4) as hereinafter described, it may be necessary or desirable to regulate the internal pressure of the first end of the bladder (1). For example, the inventor has found that standard fuel hoses can be subjected to a maximum of 20 psi. The inventor prefers to regulate the internal pressure of the bladder (1), when necessary, by means of a standard pressure regulator coupled with the intake nozzle (3D).

The system of the present invention further comprises fluid injection and expulsion means (4) affixed to the second end of the bladder (1), controlling the injection and expulsion of fluid to and from the bladder (1). The fluid injection means (4) preferably comprises a first rigid plate (4A) affixed to the interior of the second end of the bladder (1), and a second rigid plate (4B) affixed to said first rigid plate (4A) and the exterior of the second end of the bladder (1), each of said plates having an orifice, said orifices being aligned with the orifice of the second end of the bladder. Said plates are preferably affixed to each other and the bladder by means of a hollow threaded stub (4C) and threaded hole as described above for plates (3A) and (3B) of the pressure means (3).

The fluid injection and expulsion means (4) further preferably comprises a nipple (4D) affixed to the exposed end of the threaded stub (4C) so that when the plates (4A) and (4B) are affixed to one another and the bladder, a portion of the threaded stub (4C) and the nipple (4D) extend beyond the outer or exposed face of the second plate (4B). Engaged with said nipple (4D) is a male quick disconnect for use with the injection and expulsion equipment described below. A dust cap may be placed on the exposed end of the nipple (4D) to protect the same during transport. Optionally, an open cylinder may be concentrically affixed to the face of said second plate (4B), extending from the exterior of the bladder (1) and beyond the end of the nipple (4D), to protect the same from damage during transport and use.

The fluid means (4) of the present invention further preferably comprises a removable fuel hose or similar discharge equipment, which is capable of engaging with the nipple (4D) and male quick disconnect (4E) by means of a female quick disconnect (4F). In the inventor's preferred embodiment, the female quick disconnect is affixed to a close nipple, which in turn is affixed to a reducing bushing, and finally which bushing is affixed to a camlock that engages with the discharge equipment. Based upon limitations of the fuel hose preferred by the inventor, the system of the preferred embodiment of the present invention is capable of expelling liquid at a pressure preferably of no greater than 20 psi.

The fluid means (4) of the present invention finally preferably comprises a pump or other system capable of transferring the substance to be stored into the second end of the bladder (1). The pump or system is engaged with the nipple (4D) of the fluid means (4) by means of a coupler or adapter.

The method and specifics of manufacture of the present invention depends upon the size of the bladder (1), and the materials and components used to manufacture the bladder (1). Generally, the material used to manufacture the first layer of the interior of the bladder (1) and corresponding diaphragm is laid on a mandrel shaped to the intended ultimate size of the bladder (1). The second layer of the interior of the bladder (1) is then laid on top of the first layer, with a material placed between the diaphragm and the corresponding second end of the interior of the bladder (1), so that when the layers of the interior of the bladder (1) are cured together (as hereinafter described), the diaphragm is free from the interior of the bladder (1). If desired, a layer of fiber (1C) is wound around the second interior layer of the bladder (1) followed by a layer of bonding rubber or other material, as described above. Finally, the material forming the exterior of the bladder (1) is placed on top of the previously laid materials and the entire unit is bonded in a pressure/heat chamber in accordance with temperature, time and pressure as is necessary to cause the various layers of the bladder to bond together. Once bonded, the bladder is removed from the mandrel, the material between the diaphragm and the second layer of the interior of the bladder is removed, and the pressure means and fluid injection and expulsion means are assembled and affixed to the bladder.

In practice, with the first end of the bladder (1) substantially empty or with the intake nozzle (3D) open to allow free expulsion of air or fluid from the first end of the bladder (1), the second end of the bladder (1) is filled with the desired gas, liquid or semi-liquid by means of a pump or other injection system. The system of the present invention is then transported to location and a portable air or liquid compressor tank is connected to the intake nozzle (3) and a fuel hose is connected to the nipple (4D). The compressor then injects air or liquid into the first end of the bladder (1), causing the diaphragm to expand within the bladder (1), placing pressure on the substance stored in the second end of the bladder (1). When the fuel hose is engaged and open, the substance stored in the second end of the bladder (1) is discharged through the hose. The preferred regulator will limit the pressure in the first end of the bladder. After a desired amount of the stored liquid has been dispensed from the system, the air can be released from the diaphragm through the intake nozzle. When empty, the system can be folded up for compact storage and transport.

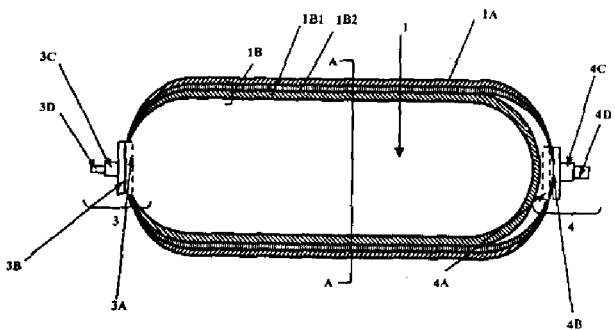

What is claimed is:

1. A transportable storage system comprising:
    a multi-layer flexible, collapsible bladder having a first and a second end;
    said bladder further having a flexible interior layer and a flexible exterior layer;
    said interior layer being partially affixed to said exterior layer and, where unaffixed, forming a barrier between the first and second ends of the bladder;
    means to inject liquids or semi-liquids into the second end of the bladder, and means to expel said liquids or semi-liquids from the second end of the bladder;
    means to inject compressed air, gas or fluid into the first end of the bladder in an amount sufficient to cause pressure to increase within the bladder.

2. The transportable storage system of claim 1, wherein said bladder is cylindrical in shape.

3. The transportable storage system of claim 1, where the interior and exterior layers of said bladder are substantially the same shape and size.

4. The transportable storage system of claim 1, where the interior layer is affixed to the exterior layer from the first end of the bladder to the longitudinal circumference of the bladder at or around the latitudinal center of the bladder.

5. The transportable storage system of claim 1, wherein the means to inject compressed air, gas or fluid comprises a portable air compressor or tank, or pressurized gas or liquid injector engaged with the bladder.

6. The transportable storage system of claim 1, wherein said means to expel liquids or semi liquids from the second end of the bladder further comprises a fuel hose engaged with the bladder.

7. A cylindrical, transportable storage system comprising:
    a multi-layer, flexible, collapsible bladder including a flexible interior layer and a flexible exterior layer;
    said interior layer having at least two sublayers, the second interior sublayer being affixed to said exterior layer;
    the first interior sublayer being partially affixed to the second interior sublayer, with the remainder of said first interior sublayer being unaffixed to the second interior sublayer;
    a pressure port permitting the injection of compressed air, gas or fluid to one end of the bladder causing pressure to increase within the bladder; and
    a fluid port permitting the injection and expulsion of liquids or semi-liquids from the other end of the bladder when the bladder is pressurized by means of the injected compressed air, gas or fluid.

8. The transportable storage system of claim 7, where the first interior layer is affixed to the second interior layer from one end of the bladder to the longitudinal circumference of the bladder at or around the latitudinal center of the bladder.

9. The transportable storage system of claim 7, where said exterior layer of the bladder is a neoprene based material, and said interior layer of the bladder is a nitrile based rubber.

10. The transportable storage system of claim 7, where the bladder further comprises layers of bonding material between the interior and exterior layers of the bladder to facilitate the bonding of said layers.

11. The transportable storage system of claims 7 or 10, where the first interior layer of the bladder is wound with one or more layers of fiber.

* * * * *

UNITED STATES PATENT AND TRADEMARK OFFICE
CERTIFICATE OF CORRECTION

PATENT NO.     : 6,786,364 B2
DATED          : September 7, 2004
INVENTOR(S)    : McBride It is certified that error appears in the above-identified patent and that said Letters Patent is hereby corrected as shown below:

Title page illustrating a drawing figure should be deleted, and substitute therefor title page illustrating a figure as shown on the attached sheet.

Delete drawing sheets 1&2 and substitute therefore drawing sheets 1&2. (Attached)

Signed and Sealed this

First Day of February, 2005

JON W. DUDAS
*Director of the United States Patent and Trademark Office*

(12) United States Patent
McBride

(10) Patent No.: US 6,786,364 B2
(45) Date of Patent: Sep. 7, 2004

(54) TRANSPORTABLE STORAGE WITH AN AUTONOMOUS DISPENSING SYSTEM

(76) Inventor: Dale McBride, P.O. Box 1374, Morgantown, WV (US) 26507

(*) Notice: Subject to any disclaimer, the term of this patent is extended or adjusted under 35 U.S.C. 154(b) by 0 days.

(21) Appl. No.: 09/682,225

(22) Filed: Aug. 8, 2001

(65) Prior Publication Data
US 2003/0029888 A1 Feb. 13, 2003

(51) Int. Cl.$^7$ ............... B65D 35/56; B67D 5/42; G01F 11/00
(52) U.S. Cl. ............... 222/389; 222/386.5; 222/96; 222/105
(58) Field of Search ............... 222/95, 96, 386.5, 222/389, 105

(56) References Cited

U.S. PATENT DOCUMENTS

| | | |
|---|---|---|
| 1,743,056 A | 1/1930 | Whitaker |
| 2,209,570 A | 7/1940 | Kraft |
| 2,451,911 A | 10/1948 | Braden |
| 2,612,924 A | 10/1952 | Cunningham |
| 2,615,487 A | 10/1952 | Cunningham |
| 2,724,418 A | 11/1955 | Krupp |
| 2,744,043 A | 5/1956 | Ramberg |
| 2,848,133 A | 8/1958 | Ramberg |
| 2,851,075 A | 9/1958 | Palley |
| 2,854,048 A | 9/1958 | Cunningham |
| 2,865,419 A | 12/1958 | Cunningham |
| 2,969,102 A | 1/1961 | Cunningham |
| 2,991,815 A | 7/1961 | Pfeiffer |
| 3,009,566 A | 11/1961 | Oakley |
| 3,123,254 A | 3/1964 | Babby et al. |
| 3,178,050 A | 4/1965 | Doerpingahus |
| 3,282,361 A | 11/1966 | Mackie |
| 3,334,676 A | 8/1967 | Girard |
| 3,339,803 A | 9/1967 | Wayne et al. |
| 3,400,741 A | 9/1968 | Robinson et al. |
| 3,404,813 A | 10/1968 | Waxman |
| 3,468,731 A | 9/1969 | Oheda |
| 3,478,952 A | 11/1969 | Perlman |
| 3,504,827 A | 4/1970 | Larson |
| 3,559,708 A | 2/1971 | Cook |
| 3,592,360 A | 7/1971 | Aleck |
| 3,722,751 A | 3/1973 | Bisciglia |
| 3,921,674 A | 11/1975 | Logan et al. |
| 3,982,573 A | 9/1976 | Jones |
| 4,010,783 A | 3/1977 | Ralston |
| 4,213,545 A | 7/1980 | Thompson et al. |
| 4,216,881 A | 8/1980 | Rosman |
| 4,468,812 A | 8/1984 | Grosvenor |
| 4,522,235 A | 6/1985 | Kluss et al. |
| 4,567,918 A | 2/1986 | Cantel |
| 4,597,425 A | 7/1986 | Tally |
| 4,690,306 A | 9/1987 | Staheli |
| 4,714,178 A | 12/1987 | Bohl et al. |
| 4,732,299 A | 3/1988 | Hoyt |
| 4,817,830 A * | 4/1989 | Yavorsky ............ 222/386.5 |
| 4,826,045 A | 5/1989 | Price et al. |
| 5,115,947 A | 5/1992 | McDonnell |
| 5,230,566 A | 7/1993 | Jackson et al. |
| 5,344,045 A * | 9/1994 | Richter et al. ......... 222/386.5 |
| 5,398,851 A * | 3/1995 | Sancoff et al. ........ 222/386.5 |
| 5,435,468 A * | 7/1995 | Clark, II .............. 222/389 |
| 5,499,743 A | 3/1996 | Blumenkron |
| 5,647,510 A | 7/1997 | Keller |
| 6,129,236 A * | 10/2000 | Osokin et al. ........ 222/386.5 |

* cited by examiner

Primary Examiner—Kevin Shaver
Assistant Examiner—Stephanie L. Willat
(74) Attorney, Agent, or Firm—Jackson Kelly PLLC; Monika J. Hussell

(57) ABSTRACT

The system of the present invention has a flexible bladder designed to provide for the transfer of liquids from a storage/transport unit to vehicles without the necessity of pumps and/or motors. The system includes a flexible, collapsible bladder that uses compressed gas or air, or a pressurized liquid, to pressurize the unit. The bladder is constructed with a flexible internal diaphragm which extends from a portion of the interior of the bladder, and separates the ends of the bladder. The system further comprises removable means to inject air, gas or fluid into the first end of the bladder and removable means to inject and expel the fluid stored in the second end of the bladder.

11 Claims, 4 Drawing Sheets